United States Patent [19]
Vaughn

[11] 3,817,609
[45] *June 18, 1974

[54] ANIMATION SYSTEM
[76] Inventor: Charles A. Vaughn, 2665 Regency Dr., East, Tucker, Ga. 30084
[ * ] Notice: The portion of the term of this patent subsequent to Sept. 12, 1989, has been disclaimed.
[22] Filed: Sept. 8, 1972
[21] Appl. No.: 287,582

Related U.S. Application Data
[63] Continuation of Ser. No. 83,900, Oct. 26, 1970, Pat. No. 3,690,747.

[52] U.S. Cl............................ 352/87, 95/86, 352/50
[51] Int. Cl. .......................................... G03b 21/32
[58] Field of Search ................... 352/87, 85, 50, 54; 95/12.5, 86

[56] References Cited
UNITED STATES PATENTS
3,158,079  11/1964  Willits et al.......................... 95/12.5
3,415,600  12/1968  Yarbrough............................ 352/87

Primary Examiner—Richard L. Moses
Attorney, Agent, or Firm—Jones, Thomas & Askew

[57] ABSTRACT

An animation system in which a camera means for exposing frames of film to photograph an object and a support means for supporting the object with respect to the camera means are moved relative to each other in accordance with motion data and status data converted by a computing means into a plurality of data outputs to which a motion means for moving the camera means and the support means relative to each other is responsive, each of the plurality of data outputs including a number of electrical pulses indicative of the motion data and occurring in response to status data. The motion data is converted by the computing means so that the numbers of electrical pulses in the data outputs differ selectively to cause that varying motion of the camera means and support means relative to each other which creates the illusion of an object accelerating or decelerating in the frames of film exposed by the camera means.

10 Claims, 2 Drawing Figures

3,817,609

ANIMATION SYSTEM

This is a continuation of application Ser. No. 83,900, filed Oct. 26, 1970, now U.S. Pat. No. 3,690,747.

BACKGROUND OF THE INVENTION

1. Field of the Invention

This invention relates to an animation system and more particularly, to an animation system in which a camera means for exposing frames of film to photograph an object and a support means for supporting the object with respect to the camera means are moved relative to each other in accordance with motion data and status data converted by a computing means into a plurality of data outputs.

2. Description of the Prior Art

Animation in motion pictures requires the repeated photographing of an object or objects drawn or placed in a plurality of different positions with respect to a camera means for exposing frames of film. Each photographing of an object exposes a frame of film and a plurality of frames of film provide a motion picture in which the illusion of the object being in motion is present even though the object was stationary each time a frame of film was exposed.

Typically, animation in motion pictures is provided by a camera means, by a support means for supporting an object with respect to the camera means, and by a motion means for moving and positioning the camera means and the support means relative to each other so that positions of the camera means and the support means relative to each other provide different positions of the object and the camera means with respect to each other. Generally, the motion means is manually operated and the plurality of positions of the camera means and the support means relative to each other that are provided by the motion means are determined by laborious and time consuming mental calculations which frequently do not result in those positions of an object with respect to the camera means that are necessary to create the illusion desired.

Attempts have been made in the prior art to provide an animation system which avoids these difficulties with respect to animation in motion pictures. In such a prior art animation system, a motion means is responsive to the data output from a tape reader or similar device for providing the data output from stored data. However, a difficulty with this prior art animation system is that the preparation of the stored data requires laborious and time consuming metal calculations or the use of a separate computing means.

A further difficulty with this prior art animation system is that once the stored data has been prepared, the operation of the animation system is relatively inflexible and cannot be readily modified to achieve artistic and other effects. Further, illusions such as the illusion of an object accelerating or decelerating are a function of the stored data and even when the stored data has been prepared using a separate computing means, such illusions have frequently not been artistically satisfactory.

SUMMARY OF THE INVENTION

The invention disclosed herein is an animation system which avoids these and other difficulties encountered in the prior art with respect to animation in motion pictures. This is because the invention provides an animation system in which a motion means moves a camera means and a support means relative to each other in accordance with motion data and status data converted by a computing means into a plurality of data outputs to which the motion means and the camera means are responsive. The motion data and status data do not require laborious and time consuming calculations in their preparation and deviation data readily changes the response of the motion means and the camera means to data outputs so that special effects or changes dictated by operator judgment are easily achieved. Moreover, the invention provides an animation system in which illusions such as the illusion of an object accelerating or decelerating are artistically satisfactory even though the motion data and status data are easy and convenient to prepare.

These improvements in an animation system are provided by an animation system which includes a camera means for exposing frames of film to photograph an object, a support means for supporting an object with respect to the camera means, a motion means for moving the camera means and the support means relative to each other so as to place the camera means and the object in a plurality of positions with respect to each, a computing means for converting motion data and status data into a plurality of data outputs to which the motion means and the camera means are responsive, a deviation means for providing deviation data which selectively changes the response of the motion means and the camera means to the plurality of data outputs, a signal means for providing status data to the computing means in response to the operation of the camera means, and an input means for providing motion data to the computing means as an alpha numeric input.

The deviation means includes a camera control means for rendering the camera means selectively inoperative to the data output from the computing means, for rendering the camera means ineffective to expose a frame of film even though the camera means is otherwise operative, for selectively causing the camera means to be operative even though it is not responsive to a data output from the computing means, for indicating a data output from the computing means to which the camera means is responsive, and for simulating status data to the computing means even though the signal means is not operative. Further, the deviation means includes a platen operating means for operating a platen positioning means which serves as a means for raising and lowering a platen holding an object on the support means. In addition, the deviation means includes a motion control means for rendering the motion means selectively inoperative in response to data outputs from the computing means and for rendering the motion means operative in the absence of data outputs from the computing means.

In addition to the features described above, the animation system may include a display means for selectively displaying the plurality of data outputs from the computing means and an indicating means for indicating the response of the motion means to the plurality of data outputs from the computing means. Although an animation system provided by the invention is a highly versatile means for providing animation in motion pictures and although animation in motion pictures is conveniently and efficiently achieved, the animation system is relatively inexpensive and easy to maintain and operate.

BRIEF DESCRIPTION OF THE DRAWING

These and other features and advantages of the invention will be more clearly understood from the following detailed description and the accompanying drawing in which like characters of reference designate corresponding parts throughout and in which.

DESCRIPTION OF AN EMBODIMENT

These figures and the following detailed description disclose a specific embodiment of the invention. However, it will be understood that the invention may be embodied in other equivalent forms and methods without departing from the inventive scope.

The invention disclosed herein is most easily understood as an animation system comprising a camera means C for exposing frames of film, a support means P for positioning an object (not shown) with respect to the camera means C, a motion means M for moving the support means P and the camera means C relative to each other so as to place an object in a plurality of positions with respect to the camera means C, a computing means O for converting motion data and status data into a plurality of data outputs to which the motion means M and the camera means C are responsive, and a deviation means D for providing deviation data which changes the response of the motion means M and the camera means C to the plurality of data outputs. The camera means C and the support means P are shown only as the dashed line boxes C and P in FIG. 1 because they are generally conventional and because the details of their construction and arrangement will be understood by those skilled in the art from the following description of the invention and from such prior art as pages 19–39 in The Focal Encyclopedia of Film and Television Techniques published in 1969 by Hastings House, Publishers, Inc., New York, New York.

Thus, those skilled in the art will understand that the camera means C includes a shutter motor 10 which is operative in response to command pulses. Similarly, those skilled in the art will understand that the support means P includes a table which is generally rotatable and linearly movable in directions generally designated as north, south, east and west by rotation of shafts. In addition, the support means P generally includes four peg tracks movable along their lengths by rotation of shafts. The rotation of shafts in a support means P is generally accomplished manually by cranks attached to the shafts so that the shafts and cranks provide a form of motion means for moving the support means P and an object positioned on the support means P relative to the camera means C.

In the invention disclosed herein, the motor means M also includes motors 11 by which those shafts in a support means P which provide motion of the table and of the peg tracks are rotated. Further, the motion means M also includes a zoom motor 12 which is operative to move the camera means C towards and away from the support means P as will be understood by those skilled in the art. The motion means M may also include a motor which is for rotating the camera means C and support means P relative to each about an axis and which is not shown because its use and control in the invention will be understood by those skilled in the art from the use and control of the motors 11 and 12.

Figure 1:
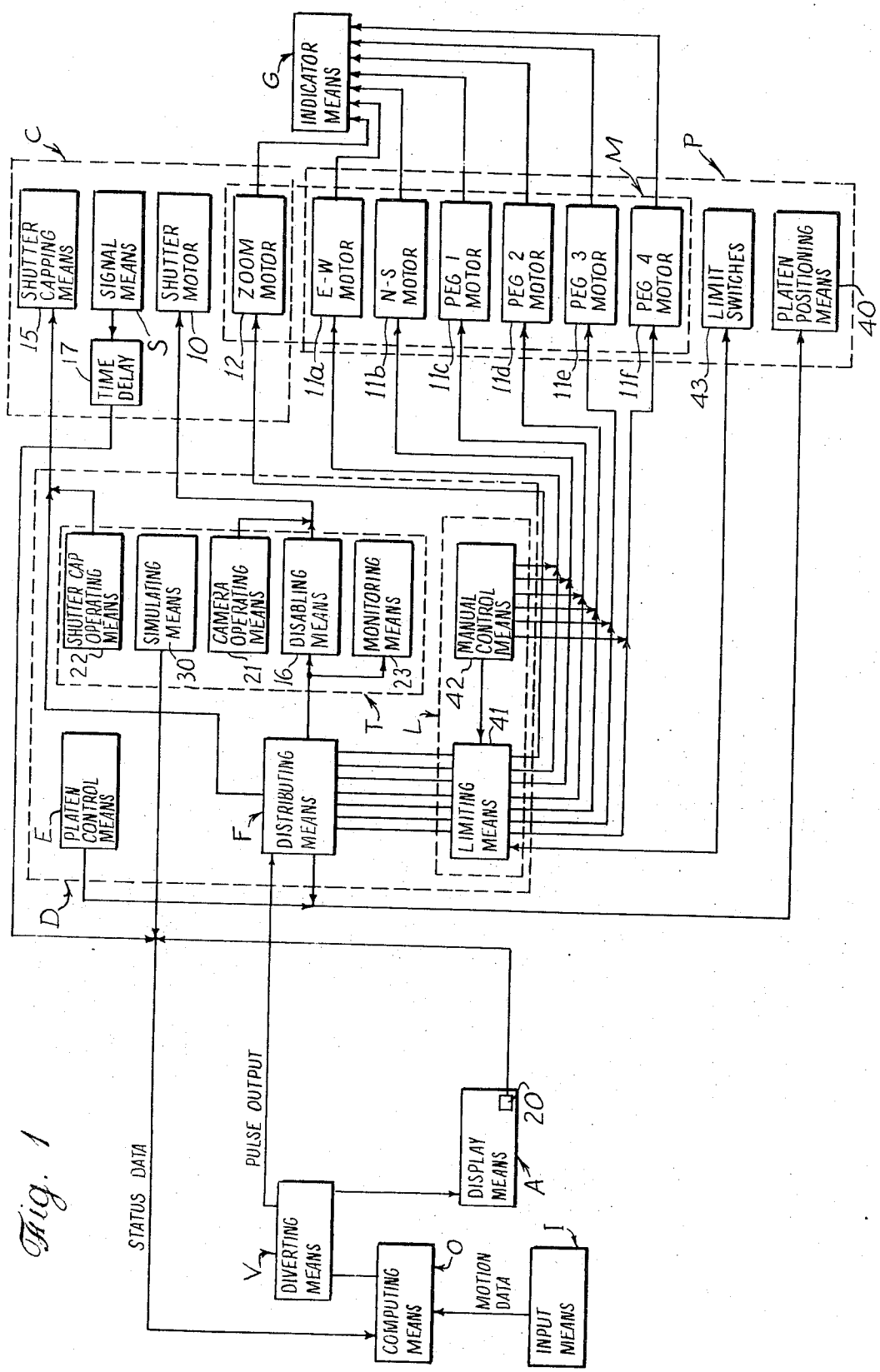
FIG. 1 is a schematic diagram of an animation system embodying the invention disclosed herein.

From FIG. 1 it will be seen that the motors 11 include an east-west motor 11a which is operative to rotate that shaft which provides for motion of a table in the support means P in the direction generally designated as east-west, a north-south motor 11b which is operative to rotate that shaft which provides for motion of the table in the direction generally designated as north-south, and motors 11c, 11d, 11e and 11f which are operative to rotate those shafts which provide for motion of the peg tracks along their lengths. The motors 11 are stepping motors which are responsive to electrical pulses and are selected so that 20 electrical pulses are required for one complete revolution of the particular shaft rotated by a motor 11.

If the shafts in a support means P are arranged so that one complete revolution of a shaft will impart motion to the table or a peg track which is of a magnitude of one-fifth of an inch, each electrical pulse to a motor 11 will cause motion of an object by the support means P which is of the magnitude of one-hundredth of an inch. However, it will be understood that the particular motion imparted to an object by each electrical pulse is dependent upon the particular arrangement of shafts and motors 11 utilized in the invention.

The motor 12 is also responsive to electrical pulses and it will also be understood that each electrical pulse to the motor 12 causes a small predetermined motion of the camera in the camera means C toward or away from an object positioned by the support means P. The electrical pulses to which the motors 11 and 12 are responsive are provided by the pulse data in the data outputs from the computing means O which is most conveniently a conventional digital computer programmed in a manner which will be apparent to those skilled in the art once the invention herein is fully understood.

In that embodiment of the invention disclosed herein, the pulse data in the data outputs from the computing means O may be simultaneously applied to all of the motors 11 and 12 or sequentially applied to the motors 11 and 12. Regardless of whether the pulse data to the motors 11 and 12 is simultaneous or sequential, the pulse data in each data output is a particular number of electrical pulses which cause a motor 11 or 12 in the motion means M to provide a predetermined motion to the support means P or the camera means C. Moreover, whether simultaneous or sequential, the pulse data for a plurality of motors 11 and 12 is generally included in a single data output from the computing means O.

The number of electrical pulses in the pulse data for a particular motor 11 or 12 is determined by the motion data provided to the computing means O by an input means I such as a conventional tele-typewriter. In many uses of the animation system disclosed herein, the motion data will simply be in terms of the total motion between frames of film to be provided by each of the plurality of motors 11 and 12 and the total number of frames of film which are to be positioned by the camera means C for exposure during this total motion. If each electrical pulse provides motion of one-hundredth of an inch magnitude and if the total motion to be provided by a particular motor 11 or 12 is in hundreds of an inch, each hundredth of an inch corresponds to an electrical pulse and it is simply necessary for the computing means O to divide the total motion by the number of data outputs required in order to determine the number of electrical pulses in the pulse data included in each of the data outputs.

It will be understood that the number of data outputs required will generally be the total number of frames less one and that the electrical pulses in the pulse data included in the data outputs will be substantially equal in number and will, when added together, provide the total motion. However, in those uses of the animation system disclosed herein in which it is desired to provide a series of frames of film by which the illusion of the acceleration or deceleration of an object is created, the motion data will also include the number of frames of film in which the illusion of acceleration or deceleration is to appear. In response to such motion data, the computing means O provides pulse data for a series of data outputs in which the number of electrical pulses are not substantially equal in number.

This is best understood by considering the pulse data for a particular motor 11 or 12, such as the motor 11a, in a series of data outputs. When the total motion of the support means P relative to the camera means C which is to be provided by the motor 11a is in hundreds of an inch, the total number of electrical pulses T required to provide this total motion is equal to the number of hundredths of an inch in the total motion. Moreover, the total number of data outputs F including pulse data will be one less than the total number of frames of film to be exposed during the total motion and the number of data outputs N for those frames of film in which the illusion of acceleration, deceleration or both is to appear will be one less than the number of these frames.

Thus, from data input including total motion to be provided by the motor 11a, the total number of frames of film to be exposed during this total motion, and the number of frames of film in which the illusions of the acceleration or deceleration of an object is to occur, the computing means O readily determines the total number of electrical pulses T, the total number of data outputs F, and the number of data outputs N between those frames of film in which the illusion of acceleration or deceleration is to appear.

The number of data outputs Z between those frames of film in which the illusion of the acceleration or deceleration of an object is not to appear is simply the difference F − N and computing means O determines the total number of electrical pulses H in the pulse data included in the data outputs Z as follows:

$$H = Z \cdot T/F - K (N - \csc 90/N) \quad (1)$$

where K is 1 if only the illusion of acceleration or deceleration is to appear and K is 2 if both the illusion of acceleration and deceleration is to appear.

The number of electrical pulses P in the pulse data included in each of the data outputs Z for a frame of film in which the illusion of acceleration or deceleration is not to appear is:

$$P = H/Z \quad (2)$$

It will be understood that the number of electrical pulses in the pulse data included in the data outputs Z is the same for each data output Z. However, the number of electrical pulses in the pulse data included in each data output N is different for each data output N and is a portion of the number of electrical pulses B which is the difference T − H.

Figure 2:
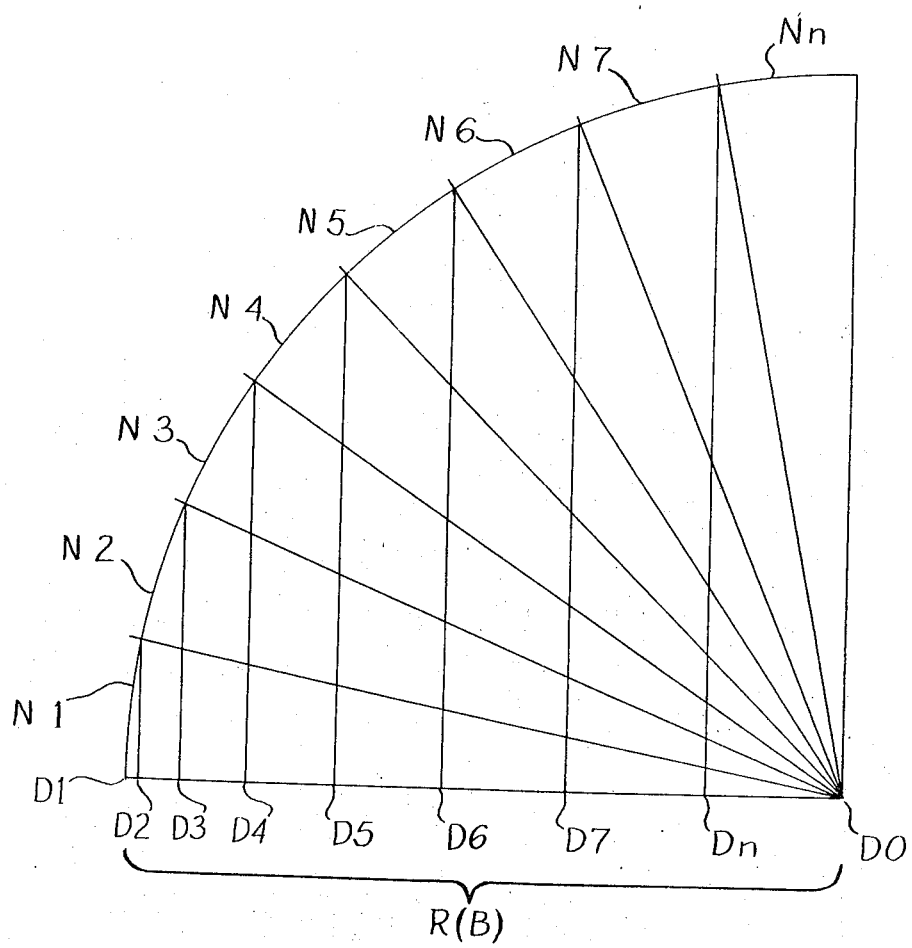
FIG. 2 is a diagrammatic presentation of the manner in which the computing means in the animation system shown in FIG. 1 computes the pulse data in the data outputs required for that motion of a support means and a camera means relative to each other which creates the illusion of an object accelerating or decelerating in a sequence of frames of film.

The manner in which the computing means O determines the number of electrical pulses in the pulse data included in each of the data outputs N is graphically shown by FIG. 2 in which the data outputs N are shown as the arc segments N1, ..., N$n$ into which the arc of a circle is divided. The arc of a circle has a radius R proportional to the number of electrical pulses B and is subtended by two radii perpendicular to each other.

The number of electrical pulses in the pulse data included in each data output N is determined in the computing means O by the ratios of the line segments such as the line segment D1–D2 to the radius R. Each line segment such as the line segment D1–D2 is determined by obtaining distances D1–D0 and D2–D0 using simply trigonometric principles and by subtracting the distance D2–D0 from the distance D1–D0. It will be seen from FIG. 2 the number of electrical pulses in pulse data included in the first of the data outputs N is relatively small and that the number of electrical pulses in the pulse data included in subsequent data outputs N increases by an inverse sine relationship until the number of electrical pulses in the pulse data included in the last of the data outputs N is substantially equal to the number of electrical pulses in the pulse data included in the data outputs Z. The result of the distribution of the electrical pulses T as described above by the computing means O is an illusion of the acceleration or deceleration of an object which is life-like and artistically pleasing.

The data outputs from the computing means O not only include pulse data to which the motors 11 and 12 are responsive but they also include command pulses to the shutter motor 10 and may include shutter capping pulses to a shutter capping means 15 or platen control pulses to a platen positioning means 40. The shutter capping means 15 is rendered operative and inoperative in response to shutter capping pulses to cover the lens of the camera in the camera means C so that the operation of the shutter by the shutter motor 10 does not expose a frame of film and the platen positioning means 40 is operative in response to platen control pulses to change the position of a platen (not shown).

The shutter capping means 15 and the platen positioning means 40 will be better understood from the description of the deviation means D below. However, at this point it will be understood that a command pulse in the data output from the computing means O causes the shutter motor 10 to move film within the camera means C and to operate the shutter to expose a frame of film. Moreover, it will be understood that when the shutter motor 10 moves film within the camera means C, it positions a new frame of film relative to the lens in the camera means C. Further, it will be understood that the direction in which the shutter motor 10 moves the film within the camera means C is determined by a characteristic such as polarity of the command pulse.

It will also be understood that in moving the film within the camera means C and operating the shutter, the shutter motor 10 rotates a shaft (not shown). The rotation of this shaft in the camera means C is used by a signal means S for generating status data indicative of the operation of the shutter in the camera means C. The signal means S is shown only schematically in FIG. 1 since it may be any convenient electro-mechanical arrangement for causing an electrical pulse at a particular time during the rotation of a shaft by the shutter motor 10 in the camera means C. However, it will be understood that such an electro-mechanical arrangement may be adjustable to cause status data to occur at various shutter positions or may be used with a time delay circuit 17 to provide for the occurrence of status data at various shutter positions.

The computing means O is responsive to the status data from the signal means S so that under normal operating conditions of the animation system, a data output is provided by the computing means O only in response to status data. However, the computing means O will provide the data outputs described above to a display means A in the absence of status data from the signal means S. The display means A includes a conventional means for displaying digital data so as to permit data outputs from the computing means O to be displayed and analyzed prior to their utilization in the animation system.

Moreover, with appropriate programming of the computing means O, the display means A may be utilized to request visually a manual operation such as the changing of art work on the support means P when an appropriate point in an animation program has been reached. The display means A includes an appropriate switch means 20 from simulating status data to the computing means O so as to cause data outputs, and the data outputs from the computing means O are diverted to the display means A by a diverting means V.

The computing means O delivers data outputs to the camera means C and motion means M through the deviation means D which includes a distributing means F for distributing pulse data to the motors 11 and 12, shutter capping pulses to the shutter capping means 15, platen control pulses to the platen positioning means 40, and command pulses to the shutter motor 10. However, the deviation means D also provides a plurality of control outputs which serves as deviation data for selectively changing the response of the camera means C and the motion means M to the data outputs from computing means O.

The control outputs provided by the deviation means D are schematically shown in FIG. 1 and include control outputs from a camera control means T, a motion control means L, and a platen control means E. The camera control means T includes a disabling means 16 which serves to prevent a command pulse from passing to the shutter motor 10, a shutter cap operating means 22 for providing shutter capping pulses to the shutter capping means 15, and a camera operating means 21 for providing command pulses to the shutter motor 10.

In addition, the camera control means T includes a monitoring means 23 for providing a visual or audible indication in response to each command pulse from the computing means O and a simulating means 30 for simulating status data to the computing means O in the absence of status data from the signal means S or the switch means 20. It will be understood that the disabling means 16 is a conventional switch arrangement for opening a circuit and that the camera operating means 21, the shutter cap operating means 22, and the simulating means 30 are conventional electrical arrangements which are manually operable to provide an appropriate electrical pulse. Moreover, it will be understood that the monitoring means 23 is a conventional electrical arrangement such as one including a lamp or buzzer which will be operative in response to a command pulse from the computing means O.

The platen positioning means 40 is a conventional electro-mechanical arrangement for changing the position of a platen on the support means P in response to platen control pulses from the computing means O which cause the platen to be in a raised or lowered position. The platen control means E also provides platen control pulses to which the platen positioning means 40 is responsive and is a conventional electromechanical arrangement which is manually operable to provide the appropriate platen control pulses.

The motion control means L includes a limiting means 41 and a manual control means 42. The limiting means 41 is responsive to signal inputs from a plurality of limit switches 43 which are positioned in the support means P relative to the table and the plurality of peg tracks so as to be operated by excessive motion of the table or of a peg track. The limiting means 41 is for preventing pulse data from passing to the motors 11 and 12. Thus, if excessive motion of the table or of a peg track occurs, the limiting means 41 prevents further motion of the table and of the peg tracks in response to data outputs from the computing means O.

The manual control means 42 is manually operable to provide a control input to the limiting means 41 to cause the limiting means 41 to prevent pulse data from passing to the motors 11 and 12. When motors 11 and 12 are inoperative as a result of a control input to the limiting means 41 from the manual control means 42, the shafts in the support means P which are normally rotated by the motors 11 may be manually rotated by cranks or other devices in conventional manner. However, the manual control means 42 may also provide operating pulses to the motors 11 and 12 even though the limiting means 41 is operative. The manual control means 42 is a conventional electro-mechanical arrangement by which a control input to the limiting means 41 and operating pulses to the motors 11 and 12 are provided at the discretion of an operation.

The animation system may also include an indicating means G which is responsive to a plurality of data inputs from the motors 11 and 12 and which is arranged to provide an indication of the manner in which the motors 11 and 12 are responding to data outputs from the computing means O. The indicating means G and other features of an animation system embodying the invention will be better understood from the following description of the operation of the animation system in several modes of operation.

OPERATION

From the foregoing description of an animation system embodying the invention disclosed herein, it will be understood that the modes of operation and the animation methods provided by the invention are limited only by the skill of an operator in using the deviation means D to obtain deviation output to modify the response of the camera means C and the motion means M to the data outputs from the computing means O. A basic mode of operation provided by the data outputs from the computing means O is one in which the computing means O converts motion data from the input means I into data outputs which include pulse data to the appropriate motors 11 and 12, command pulses to the shutter motor 10, shutter capping pulses to the shutter capping means 15, and platen control pulses to the platen positioning means 40.

In this basic mode of operation, the initial data output from the computing means O will be in response to status data from the simulating means 30 and subsequent data outputs from the computing means O will be in response to status data from the signal means S. This basic mode of operation is easily modified by an operator using deviation data from the deviation means D to obtain modified modes of operation.

For example, if it is desired to omit the exposure of a frame of film without interrupting the data outputs from the computing means O, it is simply necessary for the operator to operate the shutter cap operating means 22 to cause the shutter to be capped when that frame of film is exposed by the camera means C. Similarly, if it is desired to interrupt the data outputs from the computing means O so that art work may be changed on the support means P before the exposure of a frame of film, it is simply necessary for the operator to operate the disabling means 16 and prevent the command pulse in a data output from reaching the shutter motor 10.

The operation of the disabling means 16 will not only prevent a command pulse from reaching the shutter motor 10 but will also prevent a subsequent data output from the computing means O because status data will not be provided by the signaling means S. After an operator has at his convenience changed art work on the support means p because the disabling means 16 is operative, the data outputs from the computing means O are restarted by returning the disabling means 16 to inoperative condition and by operating the camera operating means 21 if a frame of film is to be exposed without a further data output or by operating the simulating means 30 if a frame of film is to be exposed only after a further data output.

In changing art work when the data outputs from the computing means O have been interrupted by the operation of the disabling means 16, the operator may easily and conveniently use the platen control means E to operate the platen positioning means 40. Similarly, if the operator wishes to make a change in the position of the camera means C and the support means P relative to each other because of a change in art work or for another reason, the motors 11 and 12 may be operated by the manual control means 42.

Other modified modes of operation will be readily apparent to those skilled in the art from the description of the animation system and of several modified modes of operation. With respect to all modes of operation, it will be understood that the indicating means G serves to indicate visually to an operator that the camera means C and the support means P are being positioned relative to each other by data outputs from the computing means O and that the monitoring means 23 serves to indicate to an operator that a command pulse has occurred in a data output. Similarly, it will be understood that the diverting means V and the display means A provide for a basic mode of operation to be reviewed before it is utilized or modified in the animation system. This permits the data outputs to be evaluated in terms of their effectiveness or in terms of the deviation data which will be utilized from the deviation means D to obtain a modified mode of operation.

The basic mode of operation described above will provide for the illusion of an object accelerating or decelerating with appropriate motion data from the input means I. The manner in which this is accomplished has already been described above. As to other basic modes of operation, it will be readily understood by those skilled in the art that with appropriate programming of the computing means O by conventional techniques, basic modes of operation may be readily obtained which will cause the camera means C and motion means M to repeat or reverse their motions relative to each other, which will cause the frequency rate of the electrical pulses in the pulse data included in a data output to increase from an initial relatively low rate to provide for motor 11 or 12 response or decrease to a relatively low rate toward the end of the pulse data so that a motor 11 or 12 eases the support means P into a final position, which will cause the data outputs from the computer means O to be interrupted by a request on the display means A for a manual operation or which will or will not involve the platen positioning means 40 and the shutter capping means 15 being operative at various predetermined times.

A particular basic mode of operation which is provided by an animation system embodying the invention disclosed herein and which will have many advantages obvious to those skilled in the art is a basic mode of operation in which the pulse data in each of the data outputs from the computing means O provides a last electrical pulse which always rotates a motor 11 or 12 in the same particular direction regardless of the direction in which the motors 11 and 12 has been rotated previously by the pulse data. It has been found that such a last electrical pulse provides extremely accurate positioning of the camera means C and the support means P relative to each other since the last increment of motion provided by a motor 11 or 12 is always in the same direction so as to minimize the effect of slack in the gearing and other structures involved in moving a table or peg track.

Further basic and modified modes of operation and other features and advantages of the invention disclosed herein will be readily apparent to those skilled in the art from what has been said above. Moreover, it will be apparent to those skilled in the art that many changes may be made in the animation system and in the methods of operation disclosed herein without departing from the scope of the invention as defined by the appended claims.

I claim:

1. In an animation system for taking a plurality of photographs of an object to provide a series of photographs which will depict change corresponding to desired motion data input when used as successive frames in a motion picture film, including a camera having centerline and a shutter operative to expose successive frames of film in said camera, a support means for positioning an object relative to said camera, and motion means for moving said camera and said support means relative to each other in response to each of a plurality of data outputs, the improvement comprising computing means operatively connected to receive input signals corresponding to the desired motion data input and to provide each of said plurality of data outputs to said motion means in response to motion data input indicative of a motion of said camera and said support means relative to each other.

2. The animation system of claim 1 in which the motion means includes a first motor means for moving the camera and the platform means relative to each other in a first line of motion in response to a first pulse of data in one of said plurality of data outputs and a second motor means for moving the camera and the platform relative to each other in a second line of motion in response to a second pulse of data in said one of said plurality of data outputs, and both the first motor means and the second motor means are a stepping motor responsive to an electrical pulse, the improvement further comprising both said first pulse of data and said second pulse of data being a plurality of electrical pulses.

3. The animation system of claim 2 in which said computing means selectively varies the frequency rate of said plurality of electrical pulses so that the frequency rate increases from an initial relatively low rate at the beginning of said plurality of electrical pulses.

4. The animation system of claim 2 in which said first pulse of data includes a first series of said electrical pulses which cause the first motor means to move the camera and the support means in a first direction along said first line of motion and a final electrical pulse which causes the first motor means to move the camera and the support means in a second direction opposite to said first direction along said first line of motion.

5. The animation system of claim 1, wherein each of said plurality of data outputs includes a number of electrical pulses, the motion means is operative as a function of the frequency rate of said electrical pulses, and said computing means is operative to selectively vary the frequency rate of said plurality of electrical pulses occurring in said data outputs as a function of said motion data input.

6. The animation system of claim 1 in which each of said plurality of data outputs includes a number of electrical pulses and in which said number of electrical pulses in one of said plurality of data outputs and said number of electrical pulses in another of said plurality of data outputs are to each other as two segments of a base line, said base line having a length proportional to all of said electrical pulses and said segments having lengths defined by the projection on said base line of equal lengths of an arc of a circle subtended by said base line as the radius of said circle and by a second line perpendicular to said base line at the center of said circle, and said equal lengths being equal in number to said plurality of data outputs.

7. The animation system of claim 6 in which said plurality of data outputs is a first plurality of data outputs, in which said motion of the camera and the platform means relative to each other is responsive to said electrical pulses and provided by said first plurality of data outputs and by a second plurality of data outputs, and in which all of said second plurality of data outputs include the same number of electrical pulses.

8. The animation system of claim 7 in which the number of electrical pulses in the last of said first plurality of data outputs is substantially equal to said same number of electrical pulses included in each individual one of said second plurality of data outputs.

9. The animation system of claim 7 in which the number of electrical pulses in the first of said first plurality of data outputs is substantially equal to said same number of electrical pulses included in each individual one of said second plurality of data outputs.

10. The animation system of claim 7 in which all of said electrical pulses in all of said second plurality of data outputs are equal in number to $$Z \cdot T/F - K (N - \csc 90/N)$$

where T is the number of electrical pulses in all of said first plurality of data outputs and in all of said second plurality of data outputs, F is the sum of the number of said first plurality of data outputs and the number of said second plurality of data outputs, N is the number of said first plurality of data outputs, Z is the number of said second plurality of data outputs, and K is a constant.

* * * * *